J. H. GARDINER.
Machine for Inserting Screws in Boots and Shoes.
No. 226,303. Patented April 6, 1880.
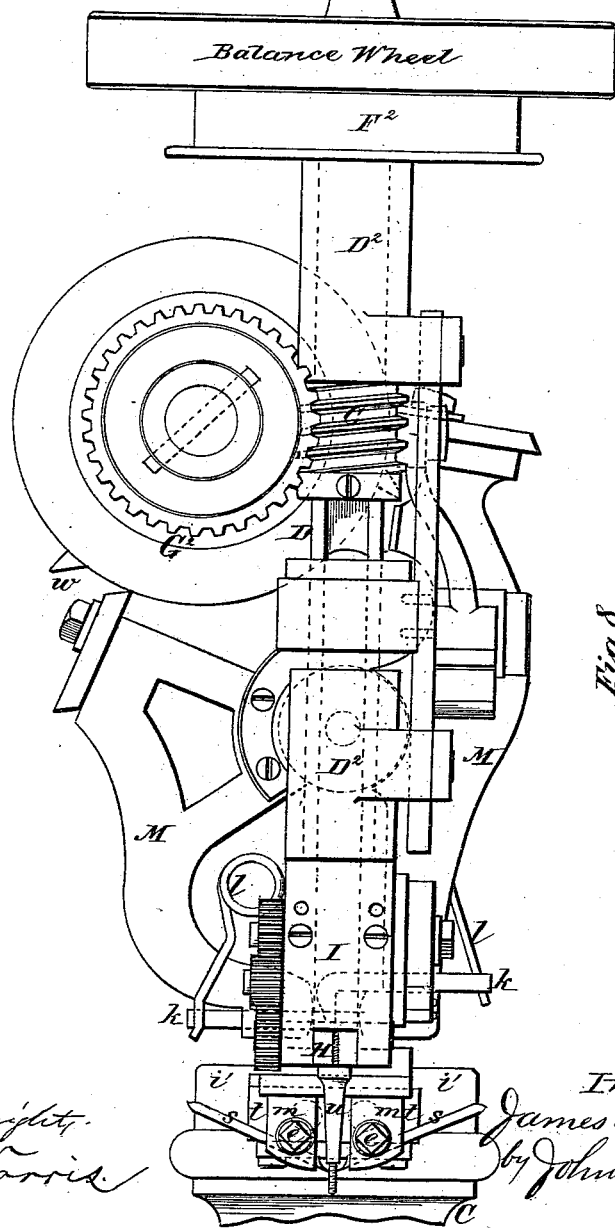

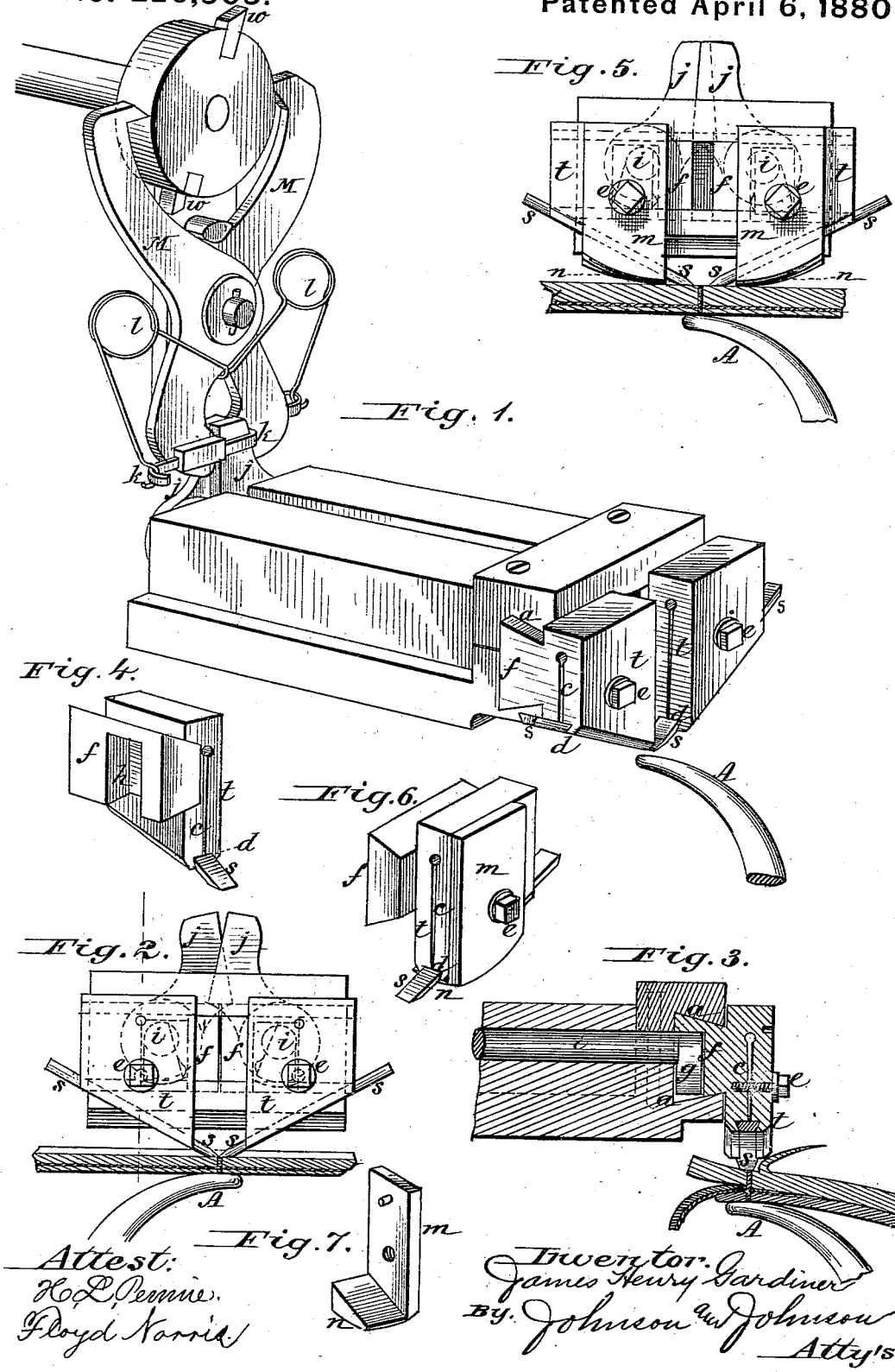

UNITED STATES PATENT OFFICE.

JAMES H. GARDINER, OF WORCESTER, MASSACHUSETTS, ASSIGNOR TO CHARLES DANA BIGELOW, OF BROOKLYN, NEW YORK.

MACHINE FOR INSERTING SCREWS IN BOOTS AND SHOES.

SPECIFICATION forming part of Letters Patent No. 226,303, dated April 6, 1880.

Application filed August 20, 1879.

*To all whom it may concern:*

Be it known that I, JAMES HENRY GARDINER, of Worcester, in the county of Worcester and Commonwealth of Massachusetts, have invented certain new and useful Improvements in Machines for Inserting Screws Cut from Screw-Threaded Wire in the Manufacture of Boots and Shoes; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The invention herein described relates to machines for inserting screws to unite the uppers to the soles in the manufacture of boots and shoes, the screws being inserted and severed from a continuous threaded coil of wire as the work is fed and supported upon a horn. All machines for this work now in use, so far as I know, are adapted for what is known in the trade as "surface" work, in which the uniting-screws are severed from the main length flush with the surface of the sole, and in which the ends of the screws show and require to be finished off.

My invention embraces a construction and organization by which the cutters are adapted to sever the inserted screws directly within the channel, and on a level, or nearly so, with the bottom thereof, thereby adapting such machines for channeled work.
My invention also embraces means for adapting one and the same machine for both channeled and surface work.

The screw-severing cutters are arranged to operate parallel with the line of the feed of the work and within and upon the bottom of the channel, in which the under faces of the cutting-knives serve as one element or the upper part of a clamp, of which the horn is the other that holds the sole and upper firmly together under the weight or action of the head while the screw is being turned in. For surface work I use, in connection with such arrangement of cutters, surface-pressers, which, being attached to the cutter-jaws, press upon the work and clamp it upon the horn by the weight or action of the head, so as to cause the cutters to work flush with the surface of the sole. This new construction increases the capacity of the machine by rendering it converti-
ble for different kinds of work.

I have used my said invention upon the machine known as the "Standard Screw Machine," patented to Louis Goddu, December 28, 1875, No. 171,610, in which the threaded wire is fed, inserted, and cut off to suit the varying thicknesses of the work, in connection with suitable wire-feeding devices and a revoluble horn for supporting the work, and in which the cutters are operated from a cam-shaft, which also operates the wire carrying and feeding devices, and which parts are carried by a head adapted to have a vertical movement to give the proper clamping pressure upon the work against the end of the horn inside the shoe, and to allow of the feed of the work. My improvements are, however, applicable to other machines in use besides the "Standard Screw Machine," the object being to cut off the nails in channeled work by cutters adapted to operate parallel with the line of the feed of the work, and placed in relative position to enter the channel of the work and cut off the inserted screw level with the bottom of the channel within which the screw ends are concealed by the covering-flap, in the same manner as stitching in sewed work is covered.

Referring to the drawings, Figure 1 represents, in perspective, the cutter carrying and operating devices, illustrating my invention in adapting the cutters of a machine for uniting the uppers to the soles of boots and shoes by screws cut from a continuous wire to operate in the line of the feed of the work and within the channel to cut the inserted screws at the bottom thereof, and in which a part of a work-supporting horn is also shown; Fig. 2, a front view of the cutter-carrying jaws in their closed position and as adapted for channeled work;
Fig. 3, a longitudinal section through one of the cutter-jaws, showing the cutters as they work in the channel of the sole and the inserted screw as it is cut from the main length on a level with the bottom of the channel;
Fig. 4, one of the cutter-jaws from the rear side; Fig. 5, a front view of the cutter-carrying jaws in their closed position and as adapted for surface work; Fig. 6, one of the cutter-jaws with the surface-work attachment; Fig. 7, the surface-work attachment; Fig. 8, a cross-section of the cutter-operating rock-shafts, looking at the rear of the cutter-jaws, and Fig. 9 a front elevation of the machine to which I have applied my improvement.

I have not shown in the drawings all the parts of the machine to which my invention is applied, as those skilled in the art will be able from an examination of said patent to understand that the cutters are arranged for operation in proper relation to the nose of the wire-carrying and screw-inserting spindle and the work-supporting horn, and that the cutters are operated in unison with the feeding and inserting devices, so as to cut the screw from the main length at the proper moment by means of stud-cams $w$ $w$, suitably arranged on a cam-shaft mounted in the head of the machine, and with such knowledge a skilled mechanic can make the necessary alterations in such machine to apply my improvements thereto, or to construct a working machine embodying my improvements for inserting screws in channeled work.

In carrying out my invention the cutters $s$ $s$ are secured in jaws $t$ $t$ adapted to operate in guides $a$ suitably arranged at the front end of the base of the head and at right angles to the position of said head, and the cutters are carried by said jaws, so as to operate parallel with the line of the work and within the channel of the sole. The cutters stand in downwardly-oblique positions to each other, and their cutting-edges meet in severing the screw, as in Figs. 2 and 9, centrally with the spindle which carries and feeds the screw-wire. The cutting ends are beveled or curved on their under sides, so as to form bearing-surfaces upon the bottom of the channel and the means of clamping the work upon the horn A, while the spindle is inserting the screw. In this function they form the upper part of a clamp of which the end of the horn is the lower part, and in such function they have a vertical movement with the head to allow of the feed of the work.

The jaws $t$ $t$ are arranged one each side of the wire-feeding spindle, and the cutters are secured at the lower sides of the jaws, and have the same oblique relation therewith, in order that the cutters may extend within the channel and form the clamping part of the head. The jaws are adapted to give the proper support to the cutters and to allow of their adjustment. In the example shown this is effected by forming the jaws with a vertical slit, $c$, which terminates in a bottom dovetail way, $d$, for the cutter, and forms a clamp of the split parts, between which the cutter is firmly secured by a screw, $e$, which passes through the jaw parts above the cutter.

The cutter-jaws are formed with rear guide-extensions, $f$, which are seated in front base-guides, and are held in place by dovetailed tenons, or in any suitable way that will hold and allow of the reciprocating movement of the cutter-jaws. These guide-extensions also serve to connect the jaws with the operating parts, which, in the example shown, consist of cam-arms $g$ $g$, working in recesses $h$ in the extensions $f$, said cam-arms standing downward from the front ends of rock-shafts $i$ $i$, working in bearings in the bed of the head. The acting ends of said cam-arms are faced with steel, and, as they are vibrated by rocking the shafts, the cutters are forced together to cut the wire and separated. These rock-shafts are connected at their rear ends by arms $j$ $j$ and links $k$ $k$, or by any other suitable connections, with suitably-arranged cam-levers M, operated from the cam-shaft, which is arranged at the top of the head in the said machine; but I do not wish to be confined to the specific arrangement shown, as it is obvious that my invention is not dependent upon any specific working connections, so long as the cutters are operated simultaneously to sever the inserted screw at the instant required within the channel of the sole. The cutters are opened at the instant of the severance of the screw by the springs $l$ acting upon the pivoted arms, or by other suitable means.

Under this construction access can be had to the cutters for adjusting their cutting-edges as they require resharpening, and they can be observed at all times. This is an important matter in such machines. This adjustment is effected by unclamping the split jaws and removing, sharpening, and replacing the cutters in their dovetail seats, the cutter-shanks being of corresponding form with the dovetail seats, and the cutters being outside of the head. The severance of the inserted screw is made just previous to the raising of the head.

The lower ends of the jaws form angles with the plane of the work and pass over the channel-flap or lip without interference therewith.

This arrangement of the cutters and their carrying-jaws gives the advantage of adapting the machine for what is known as "surface" work by means of surface-pressers attached to the jaws so as to press upon the surface of the work and form the clamping part of the head. As shown, these surface-pressers consist of attachments for the jaws, formed of a shank or face part, $m$, and a right-angled foot part, $n$, the face part being secured to the outer side of the cutter-jaw by the same screws $e$ by which the cutter is clamped in its seat, so as to bring the right-angled foot part in position beneath the jaw to form the bearing upon the surface of the work, as shown in Fig. 5. Each jaw has such an attachment, and when applied their bearing-surfaces are in the same horizontal plane with the cutter-edges to bring the cutters flush with the surface of the sole, so that for this work the jaws, cams, and cutters have the same adjustment and relation to each other as for channel-work. The machine, in fact, requires no change or adjustment for either kind of work. Its capacity for these different kinds of work results from the simple attachment of a presser-foot to each jaw in proper relation to the cutters, and to give a suitable bearing and clamping function upon the work. These presser-jaw attachments may be of any suitable form and secured in any way. Their under surfaces are rounded and curved to give the bearing at the points nearest the cutters.

In Figs. 2 and 3 the cutters are shown as they work within the channel of the sole, and in Fig. 3 the channel-lip is seen turned over and the edge of the jaw beveled, so that the lip rides easily over it as the work is fed along.

An inserted and cut-off screw is shown in its relation to the cutters and the channel in Figs. 2 and 3, and in its relation to the cutters and the presser-jaw attachments for surface work in Fig. 5. In these figures the work is also shown as being clamped in one case between the cutters and the horn, and in the other between the horn and the jaw-presser attachments; and from the foregoing description, in connection with these drawings and the patent referred to, the manner of applying my invention to a full working machine will be understood.

In Fig. 9 are shown the relation of the cutters and their carrying-jaws to the wire-guiding nose $u$ of the revolving spindle D, through which the wire passes, and which is arranged in line with the axis of the work-support.

The spindle revolves in bearings $D^2$ of the head, and carries at its upper end the spool F for the wire, and in position to allow it to uncoil in line with the wire-passage in the spindle. The spindle is revolved by a pulley, $F^2$, placed thereon below the spool, and has worm-gear G, which imparts motion to the cam-shaft through the gear-wheel $G^2$ thereon.

The feed-rolls H are situated within an enlargement, I, of the lower end of the spindle, and are operated by suitable gear-connections.

C is the standard, and $i'$ $i'$ the cranked shaft-beds.

A balance-wheel is placed on the spindle between the pulley and the spool, as shown.

It is obvious that for channel-work the cutter-jaws may be so formed as to enter the channel and form a bearing with the cutters upon the bottom of the channel.

In machines for uniting the uppers to the soles of boots and shoes by screws cut from a continuous wire,

I claim—

1. The combination, with the revolving spindle D, carrying mechanism for holding, feeding, and inserting screws cut from a continuous length of wire, and a revoluble work-supporting horn, A, of the cutters $s$ $s$, carried in movable jaws $t$ $t$ on each side of the nose $u$, of said spindle, and adapted to operate within the channel of the sole and to sever the screws on a level with the bottom of said channel, substantially as herein set forth.

2. The horizontal sliding jaws having vertical splits and upwardly-inclined seats, within which the cutters are clamped, substantially as herein set forth, in combination with guides for said jaws arranged outside of and at the front of the head of the machine, for the purpose described.

3. The horizontal sliding cutter-carrying jaws, in combination with presser attachments, substantially as and for the purpose herein set forth.

4. The screw-severing cutters, arranged and adapted to operate substantially as herein set forth, in combination with presser attachments carried by the sliding cutter-carriers, and a revoluble work-supporting horn, substantially as herein set forth.

5. The horizontal sliding jaws $t$ $t$, carrying cutters $s$ $s$, in the relation to each other and to the revolving-spindle nose $u$ substantially as herein set forth, in combination with the parallel rock-shafts $i$ $i$, having arms $j$ $j$ on their rear ends connecting with suitable operating mechanism, and cam-arms $g$ $g$ on the front ends of said rock-shafts, operating the said cutter-carrying jaws without fixed connections therewith, substantially as herein set forth.

6. The screw-severing cutters, constructed and arranged to operate within the channel of the work, substantially as herein set forth, for channel-work, and adapted, by means of pressers attached to the jaws of said cutters, for surface-work, whereby the same machine is capable of doing different kinds of work.

In testimony that I claim the foregoing I have hereto affixed my signature in the presence of two witnesses.

JAMES H. GARDINER.

Witnesses:
HENRY L. PARKER,
CHARLES F. STEVENS.